US009501867B2

(12) United States Patent
Rauschenberg et al.

(10) Patent No.: US 9,501,867 B2
(45) Date of Patent: Nov. 22, 2016

(54) SYSTEM FOR DISPLAYING THREE-DIMENSIONAL LANDSCAPES

(75) Inventors: Mario Rauschenberg, Hamburg (DE); Hendrik Meyer, Hamburg (DE); Marek Strassenburg-Kleciak, Garching (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 894 days.

(21) Appl. No.: 13/468,375

(22) Filed: May 10, 2012
(Under 37 CFR 1.47)

(65) Prior Publication Data
US 2015/0042639 A1    Feb. 12, 2015

(30) Foreign Application Priority Data
May 10, 2011    (EP) .................................... 11165443

(51) Int. Cl.
G06T 17/05    (2011.01)
G06T 17/20    (2006.01)
G01C 21/36    (2006.01)

(52) U.S. Cl.
CPC ........... *G06T 17/05* (2013.01); *G01C 21/3638* (2013.01); *G06T 17/20* (2013.01)

(58) Field of Classification Search
None
See application file for complete search history.

(56) References Cited

U.S. PATENT DOCUMENTS

2005/0107946 A1*    5/2005    Shimizu et al. .............. 701/207
2013/0138349 A1*    5/2013    Kram .............................. 702/12

OTHER PUBLICATIONS

"HEC-GeoRAS: Linking GIS to Hydraulic Analysis Using ARC/INFO and HEC-RAS" http://proceedings.esri.com/library/userconf/proc99/proceed/papers/pap682/p682.htm. Archived on Mar. 27, 2009. Retrieved from <https://web.archive.org/web/20090327101518/http://proceedings.esri.com/library/userconf/proc99/proceed/papers/pap682/p682.htm>.*
Kreveld, Marc van, and Rodrigo I. Silveira. "Embedding rivers in triangulated irregular networks with linear programming." International Journal of Geographical Information Science 25.4 (Apr. 2011): 615-631.*
Ken Joy, A Divide and Conquer Method for Curve Drawing. Archived on Jun. 8, 2010. Retrieved on Feb. 13, 2016 from <https://web.archive.org/web/20100608205817/http://www.idav.ucdavis.edu/education/CAGDNotes/Divide-and-Conquer-Bezier-Curve/Divide-and-Conquer-Bezier-Curve.html>.*
Partial European Search Report issued in European Patent Application No. 11165443.0, dated Nov. 10, 2011 (5 pgs.); European Patent Office, Berlin, Germany.
Penninga, F., "Towards 3D Topography Using a Feature-Based Integrated TIN/TEN Model," XP-002662476, 2005, pp. 1-9; retrieved Oct. 31, 2011 from URL: ftp://ftp.ecn.purdue.edu/jshan/proceedings/topology_uc12005/Integrated_TIN_TEN.pdf.

(Continued)

*Primary Examiner* — Zhengxi Liu
(74) *Attorney, Agent, or Firm* — Artegis Law Group, LLP

(57) ABSTRACT

A system for displaying three-dimensional landscapes includes a processor and a storage device in communication with the processor. The processor is configured to identify at least one predetermined landscape element in a landscape to be displayed, individually calculate a representation of the at least one predetermined landscape element and cause a display to display the landscape based on the individually calculated representation of the at least one predetermined landscape element and the altitude data.

22 Claims, 13 Drawing Sheets

(56) References Cited

OTHER PUBLICATIONS

Douglas, D.H., "Experiments With a Ridge and Channel Digital Elevation Model," Proceedings/Graphics Interface '84, May 28-Jun. 1, 1984, Ottaware Ontario, Comptes Rendus Interface Graphique '84 Computer Communications Society and the National Copmuter Graphics Association of Canada, May 28, 1984, pp. 235-237, XP008144673.

* cited by examiner

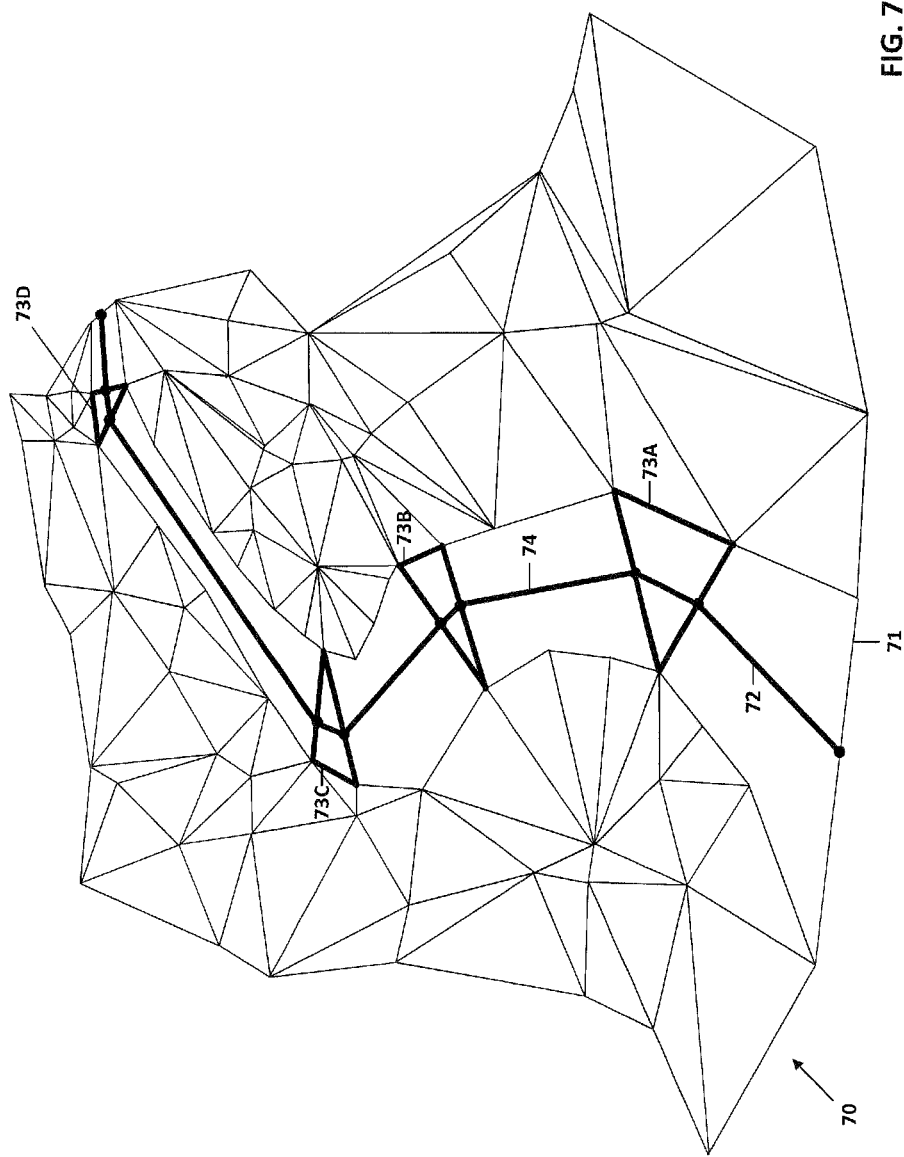

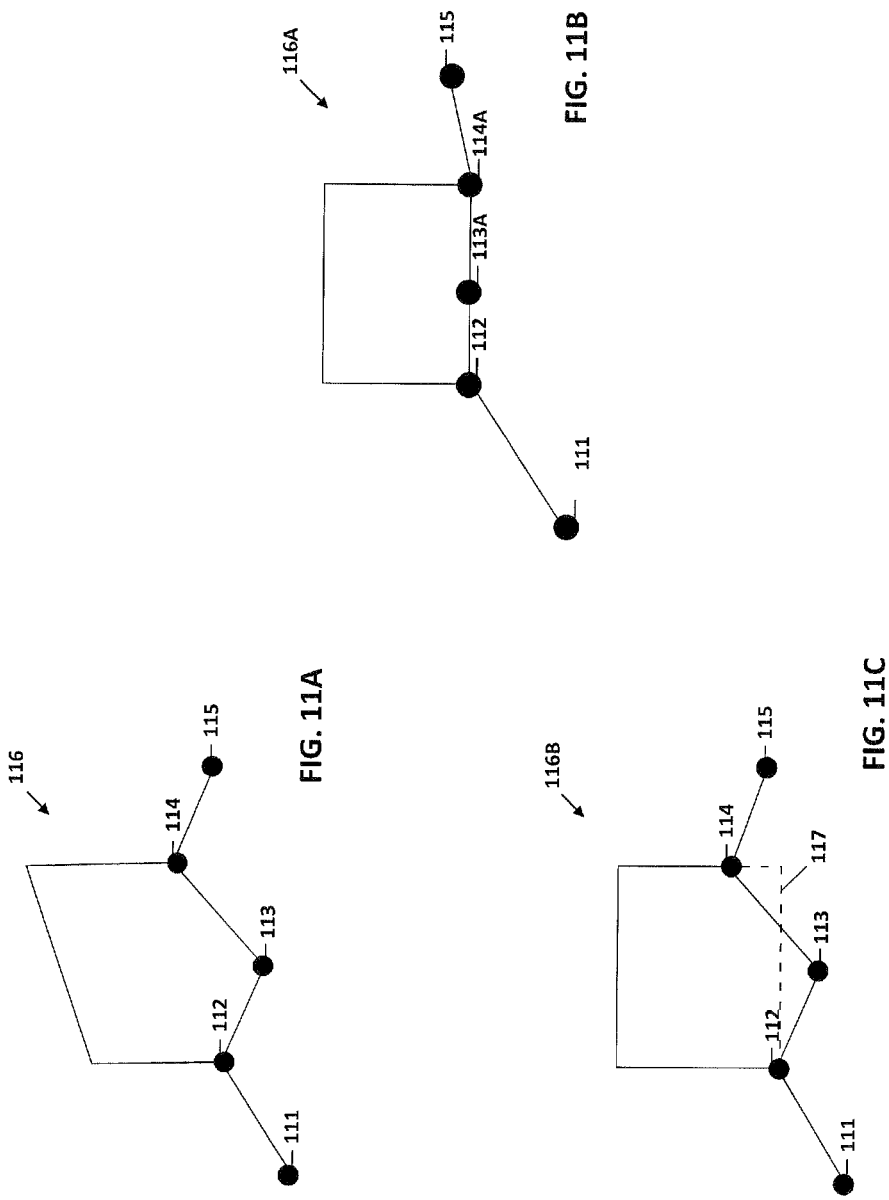

SYSTEM FOR DISPLAYING THREE-DIMENSIONAL LANDSCAPES

BACKGROUND OF THE INVENTION

1. Priority Claim

This application claims the benefit of priority from European Patent Application No. 11 165 443.0, filed May 10, 2011, which is incorporated by reference.

2. Technical Field

This invention relates to systems and methods for displaying three-dimensional landscapes, for example on displays of navigation systems.

3. Related Art

Navigation systems are used to guide a user to a destination. Usually, on a display of the navigation system the position of the navigation system may be shown with its surroundings. This may be done by showing the position on a map. However, often a three-dimensional perspective may be used, for example, the landscape surrounding the navigation system may be displayed in a three-dimensional manner.

One method for displaying such three-dimensional landscapes are so-called triangulated irregular networks. A triangulated irregular network (TIN) is a digital data structure used for the representation of a three-dimensional surface and may be made up of irregular distributed vertices, also referred to as nodes or mass points, and lines with three-dimensional coordinates, for example x, y, z, that are arranged in a network of non-overlapping triangles. TINs may be derived from altitude data of a rasterized digital altitude model.

A TIN therefore has a triangular network of vertices with associated coordinates in three dimensions as mentioned above which are connected by edges to form a triangular tessellation. Three-dimensional visualizations can then be created by rendering of the triangular facets. In regions where there may be little variation in surface height or altitude, the vertices may be widely spaced, whereas in areas of more intense variation of the altitude the vertices' density may be increased.

As explained above, between the vertices the altitude is interpolated, usually in a linear manner (for example, joining vertices by edges as described above constitutes such a linear interpolation). In some cases, this may lead to unnatural looking results. For example, if a river runs between two vertices, the river may be displayed with a slope in a direction perpendicular to its flowing direction, which does not exist for real rivers. Similar problems may occur with other landscape elements.

SUMMARY

According to a first example of the invention, a method for displaying three-dimensional landscapes is provided. The method may include the steps of (1) providing altitude data, such as triangulated network data, describing an altitude of a landscape and has a plurality of vertices, (2) identifying at least one predetermined landscape elements in the landscape to be displayed, (3) individually calculating a representation of the at least one predetermined landscape element, and (4) displaying the landscape based on the altitude data and the individually calculated representation.

By identifying elements and individually calculating representations for the identified landscape elements, a misrepresentation of such landscapes elements may be avoided. The predetermined landscape elements may for example be rivers, lakes, oceans and/or buildings. In case the landscape element is a river, the river may for example be represented by a polygon. In an example, the river may be divided into frames, and the altitude of each frame may be limited to the altitude of the previous frame. In this way, it may be ensured that the river runs downwards.

Between the frames, bisecting lines may be determined and their intersections with the polygon may be used as vertices for determining the altitudes of the polygon by interpolating between the vertices. In this way, it may be prevented that a river exhibits a slope in a direction not parallel to the flowing direction of the river.

In another example, a line representation of the river may be provided, for example a line representation running along a middle line of the river. For example, the vector may run in the middle of the aforementioned frames in a flowing direction of the river. Direction changes may be identified, and endpoints/starting points of lines at such direction changes may be split, and a triangle or other plateau may be inserted at the direction change.

In case the predetermined landscape element is an ocean, an altitude of an area covered by the ocean may be set to sea level. In case the predetermined landscape element identified is a lake, in an example an average level of the lake is provided. For example, a weighted average may be provided, where a center of the lake may have a higher weight than a boarder of the lake. The altitude of the lake may then be set to the determined average level. In a further example, the identified landscape element may be a building, and the ground for the building may be leveled, for example to a lowest altitude according to the altitude data. In an example, additional vertices and therefore additional triangles may be inserted as border areas between the individually calculated representation and the remaining altitude data.

According to a second example of the invention, a system has a storage storing altitude data has a plurality of vertices, and a processor which may be configured to identify predetermined landscape elements in the landscape to be displayed and to individually calculate a representation of the identified at least one predetermined landscape element. Furthermore, the system has a display, and the processor may be further configured to cause the display to display a landscape based on the altitude data and the individually calculated representation of the at least one predetermined landscape element. The system may be configured to implement any of the methods described above, for example by programming the processor accordingly.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIGS. 6A to 6C and FIG. 7 are explanatory figures illustrating the example of FIG. 5.

FIGS. 11A to 11C are explanatory diagrams illustrating the method of FIG. 10.

DETAILED DESCRIPTION OF THE PREFERRED EXAMPLES

In the following, examples will be described with reference to the figures. It should be noted that these examples serve only for illustrating the present invention and are not to be construed as limiting. It should further be noted that features of the examples described below may be combined with each other, unless specifically noted otherwise. On the other hand, describing an example with a plurality of features is not to be construed as indicating that all those features are necessary for practicing the present invention, as other examples may have less features or alternative features.

Figure 1:
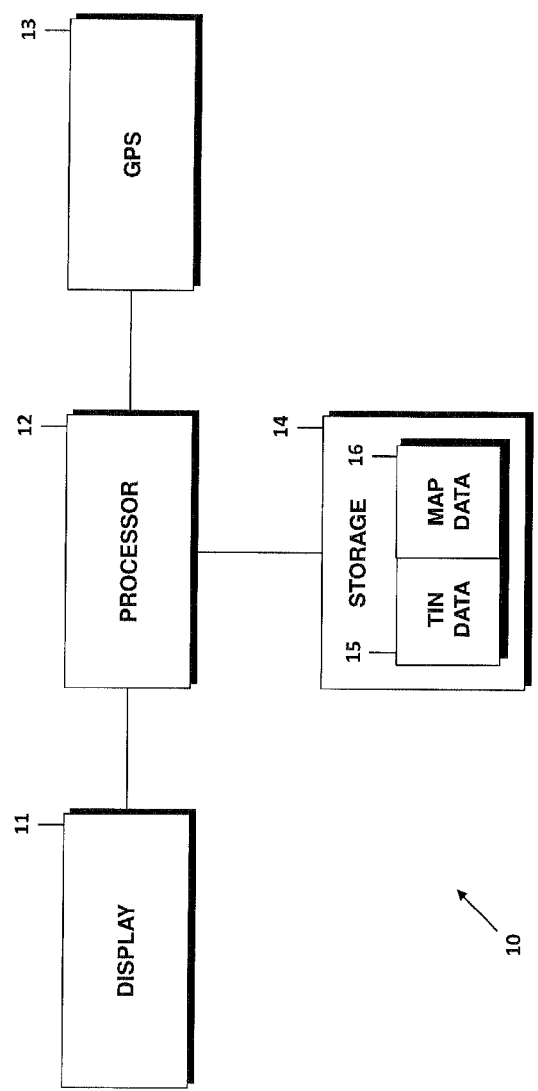
FIG. 1 is a block diagram illustrating a system for displaying three-dimensional landscapes.

In FIG. 1, a navigation system 10 according to an example is shown. Navigation system 10 includes a display 11, a processor 12, a GPS (Global Positioning System) unit 13 and a storage device 14. Processor 12 may be any suitable programmable microprocessor or any other system with processing capabilities, or may also include a plurality of sub-processors. Processor 12 executes programs for example stored in storage device 14 to provide functionalities of navigation system 10. Any conventional functionality of navigation systems may be provided, in particular calculating routes to a desired destination and displaying a current position on display 11, where the current position may for example be obtained via GPS unit 13. To this end, storage device 14 may include any necessary map data 16 for navigation, similar to conventional navigation systems. Map data 16 may for example give geographical information about the landscape to be displayed, for example the position of elements such as streets, buildings, rivers, forests, etc.

Navigation system 10 is capable of showing the surroundings of the navigation system and therefore of a user of a navigation system, for example the surroundings of a car incorporating the navigation system, or also other scenery, for example a representation of a landscape around a destination of a route, in a three-dimensional manner on display 11.

For this three-dimensional displaying, in storage device 14 triangulated irregular network (TIN) data 15 includes a plurality of vertices is shown. In other words, the coordinates of a plurality of vertices are stored including their altitude (height) coordinate, and these vertices may then be joint by edges to form triangles which then may be rendered. It should be noted that in other examples, instead of TIN data 15 also other altitude data comprising a plurality of vertices, for example a regular triangulated network where the vertices are equidistantly spaced, may be provided. It should be noted that the terms "altitude", "height" and "elevation" with respect to vertices are used interchangeably and the context of this application to refer to a height of the vertex above a given reference plane, for example sea level or any other horizontal reference plane.

In the navigation system 10 of FIG. 1, when displaying a three-dimensional landscape on display 11 predetermined landscape types are identified, and the displaying of these predetermined landscape type deviates from the displaying of the remaining landscape, which is conventionally then based on TIN data 15. It should be noted that FIG. 1 shows only some possible components of a navigation system, and other components like a user interface or an audio output are also possible. On the other hand, the application of the present invention is not restricted to navigation systems, but may also be employed in other cases, where three-dimensional landscapes are to be displayed on a display. Various implementations of the above-mentioned identifying and displaying of predetermined landscape types will be explained in the following with reference to FIGS. 2 to 11.

Figure 2:
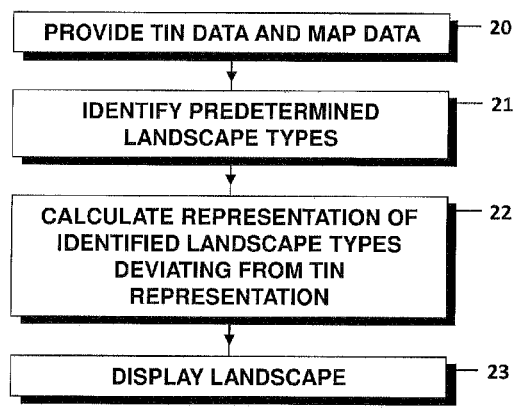
FIG. 2 is a flow chart representing a method for displaying three-dimensional landscapes.

In FIG. 2, a flow chart representing a method according to an example is shown. The methods of FIG. 2 may be implemented in the system of FIG. 1, for example by programming processor 12 accordingly, but may also be implemented independently therefrom. At 20, TIN data is provided, for example by providing TIN data in storage like storage device 14. Furthermore, at 20 map data like map data 16 of FIG. 1 is provided.

At 21, predetermined landscape types in a landscape to be displayed are identified, for example based on the map data. Predetermined landscape types may be types which, when displayed on TIN data alone, lead potentially to unrealistic results. Such landscape types may for example include rivers, lakes, oceans or buildings. At 22, 3D representations of the identified landscape types are calculated which may deviate from a representation based on the triangulated irregular network and may lead to a more realistic representation. The actions described with reference to 21 and 22 may for example be performed by processor 12 of FIG. 1. At 23, the landscape is displayed based on the TIN data and based on the calculated representation of the identified landscape types. In other words, in an example for the identified landscape types the calculated representation is used, whereas for the remaining landscape the TIN data is used for displaying.

Examples for the calculation of representations of identified landscape types according to some examples will next be explained. First, with reference to FIGS. 3 and 4 a method for handling a river in some examples of the present invention will be described. The method may for example be implemented in the navigation system of FIG. 1 and is an example for the implementation of the actions described with reference to 21 and 22 in FIG. 2 in case the predetermined landscape type is a river. However, it is to be noted that the example of FIG. 3 may also be implemented independently from the examples of FIGS. 1 and 2.

Figure 3:
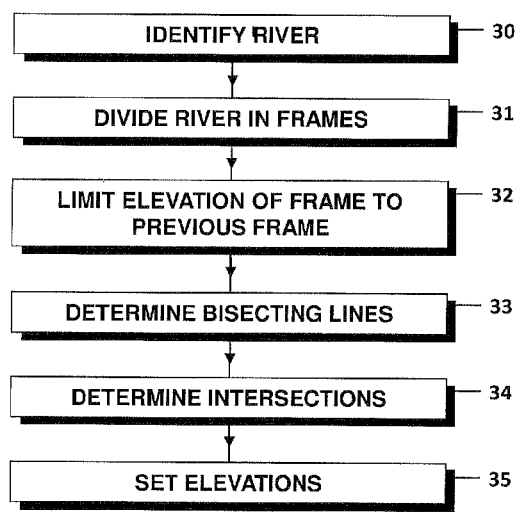
FIG. 3 is a flow chart representing a method for displaying three-dimensional landscapes according to another example.
Figure 4A:
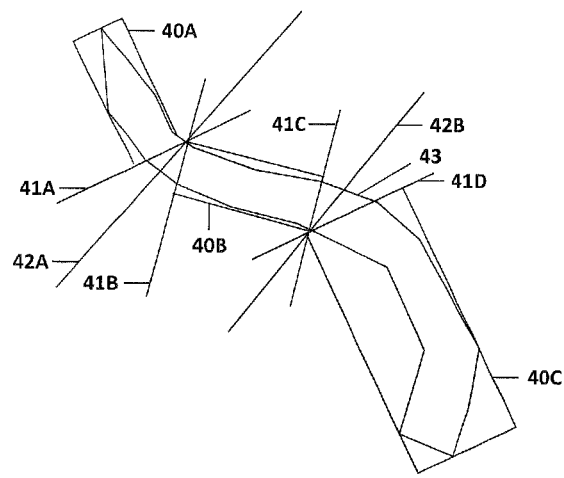
FIGS. 4A and 4B are explanatory diagrams for illustrating the method of FIG. 3.
Figure 4B:
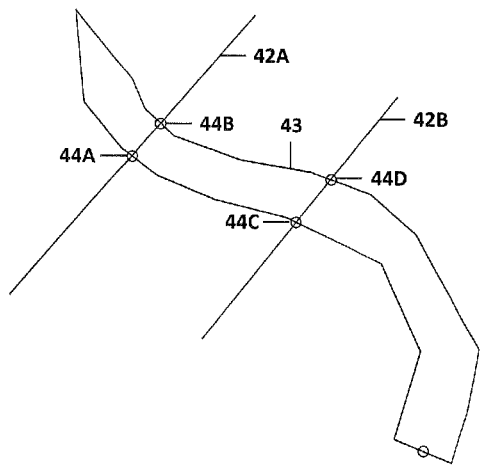

In FIG. 3 a flow chart representing a method according to an example is shown. In FIGS. 4A and 4B, illustrative, non-limiting diagrams illustrating the method of FIG. 3 further are shown. At 30 in FIG. 3, a river is identified in a landscape to be displayed. The river, for example in a map database, may for example be represented by a polygon approximating the outline of the river. For example, in FIGS. 4A and 4B a polygon 43 is shown representing a river.

At 31, the river is then divided into oriented frames, which in particular may be rectangles oriented according to a (main) direction of the river in the area covered by the frames. For example, in FIG. 4A frames 40A, 40B and 40C are shown. A criterion whether a given frame is to be further subdivided into two or more frames may be based on a maximum altitude difference of the vertices of the triangular irregular network or other altitude data in the area covered by the frames. For example, if the maximum altitude difference is below a predetermined threshold value, no further subdivision is made.

With each frame, a minimum altitude (height) of the vertices in the area covered by the respective frame may be associated. By using this minimum altitude as associated altitude for the frame, in some examples it may be achieved that the river is represented nowhere higher than the river bank. At 32, the altitude of each frame is limited to the height of the previous frame in an orographic direction, such as the direction the river flows. In this way, it is ensured in the presently discussed example that the river in the final 3D representation always runs downward. For example, if a frame has an associated altitude greater than the altitude of the previous frame, the altitude of this frame is set to the altitude of the previous frame.

At 33, bisecting lines between adjacent frames are determined. For example, in FIG. 4 a bisecting line 42A between frames 40A and 40B and a bisecting line 42B between frames 40B and 40C is shown. To clarify the position of the bisecting lines, auxiliary lines 41A to 41D are depicted in FIG. 4A which run along frame borders as shown. Bisecting line 42A bisects and angle formed by auxiliary lines 41A and 41B, and bisecting line 42B bisects an angle formed by auxiliary lines 41C and 41D.

At 34 in FIG. 3, intersections of the bisecting lines determined at 33 with the polygon describing the river are determined. In the example of FIG. 4, in FIG. 4B intersection points 44A and 44B where bisecting line 42A intersects the polygon 43 and intersection points 44C and 44D where bisecting line 42B intersects polygon 43 are shown as examples. At 35, the altitudes for the river polygon are set. To this end, intersection points determined at 34 associated with the same bisecting line, for example intersection points 44A and 44B or intersection points 44C and 44B in the example of FIG. 4B, are set to the same altitude, which may be the average altitude associated with the two frames adjacent to the respective bisecting lines, for example frames 40A and 40B for bisecting line 42A and frames 40B and 40C for bisecting line 42B. The altitudes of the remaining points of the river polygon may be linearly interpolated between the intersection points. In another example, the river point polygon may for example be replaced by triangles, for example in FIG. 4B the section between intersecting line 42A and bisecting line 42B may be represented by a first triangle with the vertices 44B, 44C and 44D and a second triangle with the vertices 44A, 44B and 44C.

Figure 5:
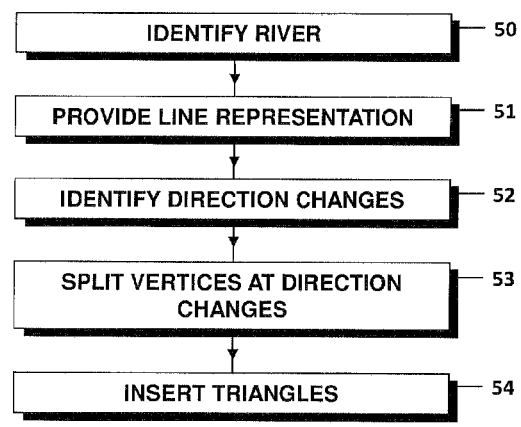
FIG. 5 is a flow chart representing a method for displaying three-dimensional landscapes according to another example.

A further method for handling a river which may be implemented in the system of FIG. 1 and which is an example for an implementation of the actions described with reference to 21 and 22 in FIG. 2 will next be explained with reference to FIGS. 5 to 7. FIG. 5 shows a flow chart representing an example of a method according to the present invention, and FIGS. 6 and 7 show illustrative diagrams for explaining some features of the example of FIG. 5.

The method of FIG. 5 may be implemented as an alternative to the method of FIG. 3. However, it should be noted that features from the example of FIGS. 3 and 5 may also be mixed to form further examples. Furthermore, a single system like navigation system 10 of FIG. 1 may implement both methods. At 50, a river is identified in a landscape to be displayed, for example based on map data. At 51, a line representation, for example a vector representation, of the river is provided. The line representation may for example represent a middle line of the river. A general example for a line representation is shown in FIG. 7 bearing reference numeral 74. In particular, the line representation may consist of a plurality of vertices arranged in the middle line of a river, for example, a connection of the vertices corresponding to the middle line of the river, the vertices representing direction changes. The connections between the vertices may also be seen as vectors, a direction of the vector indicating the flowing direction of the river.

The vertices of the line representation may for example be obtained based on a polygon representing the river like polygon 43 of FIG. 4 and may correspond to a middle line of the polygon. In an example, the vertices of the line representation may correspond to middle point between the intersection points of the bisecting lines, for example a middle point between points 44A and 44B in FIG. 4B and a middle point between points 44C and 44D in FIG. 4. In this case, the altitude of the vertices may be determined as has been described for the determination of the altitude of the intersection points based on oriented frames with which a height is associated. For example, FIG. 6A shows a vertex Px at an intersection between frames 60 and 61, as well as middle lines 62 and 63 corresponding to the above-mentioned line representation.

At 52, direction changes of the river, in particular vertices where the river changes its direction, are identified. In some examples, vertices of the line representation 51 may only be provided at direction changes of the river, such that in those cases the separate identifying of direction changes may be omitted. At 53 in FIG. 5, the vertices are split at direction changes. This will be explained using an illustrative example with reference to FIGS. 6A to 6C.

Figure 6A:
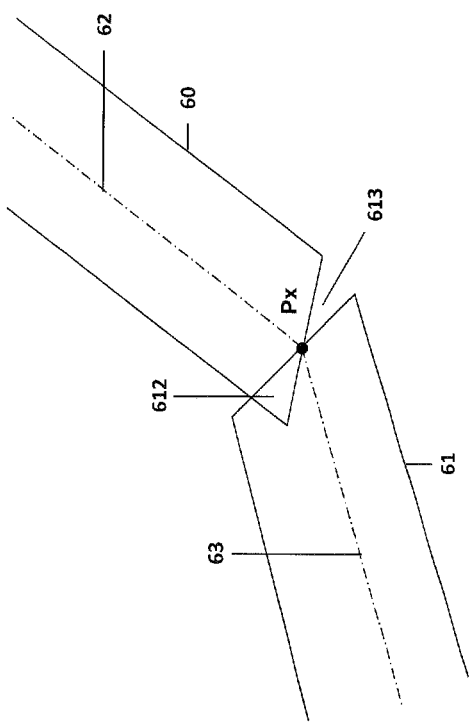

In the already explained FIG. 6A, Px is a vertex at a direction change. As can be seen in FIG. 6A, frames 60 and 61 overlap, creating an area 612 which belongs to both frames. On the other hand, an area 613 exist which is part of the river, but does not belong to any of frames 60, 61. When for example frames 60 and 61 are used for representing the river, this may lead to an unrealistic representation.

Figure 6B:
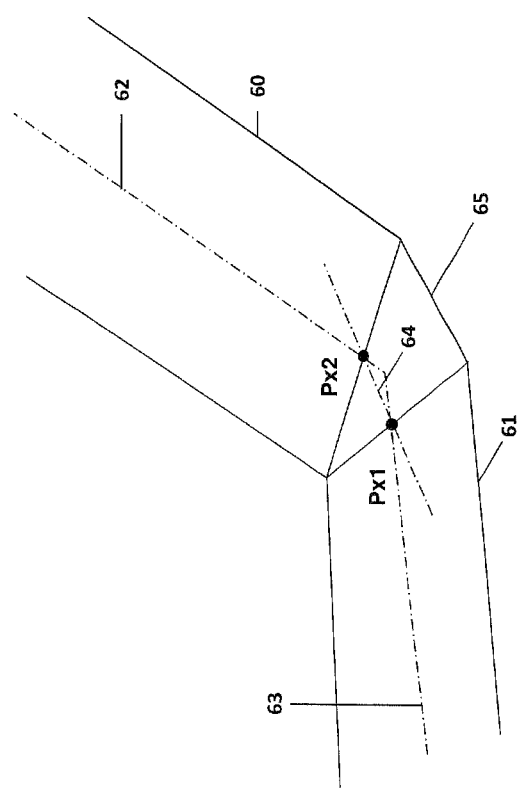
Figure 6C:
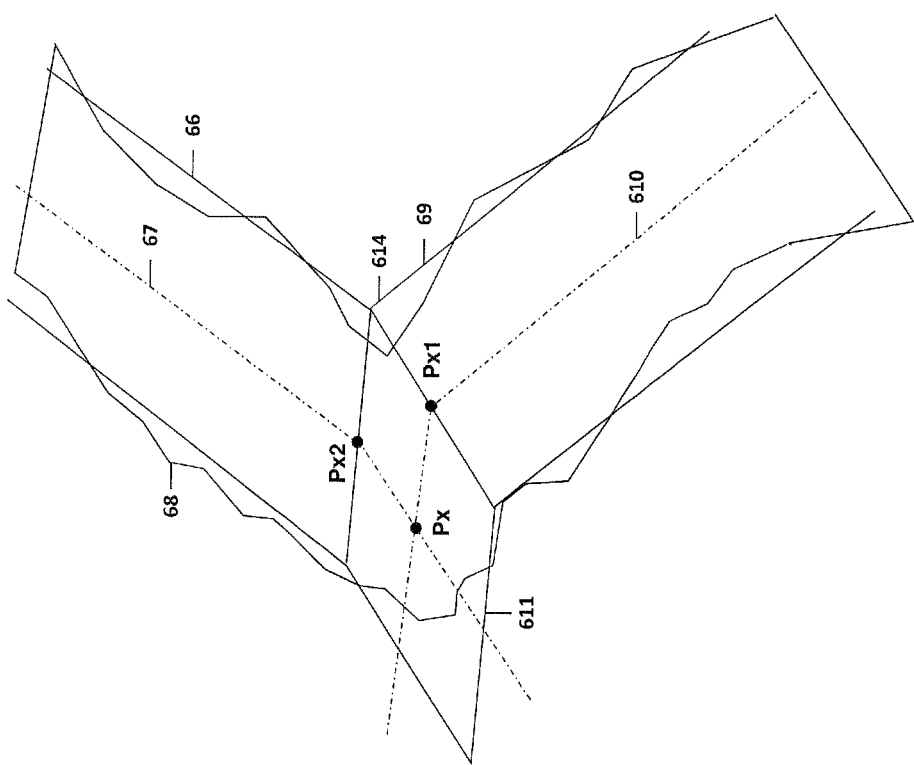

Therefore, in the currently discussed example at such a direction change the vertex, in this case vertex Px, is split into two or more vertices, which is shown in FIGS. 6B and 6C. In FIG. 6B Px is split into Px1 and Px2, adding an additional line 64 and a triangle 65. In this way, no overlapping zones between frame 60 and 61 and no zone like zone 613 exist.

In FIG. 6C, a further example is shown with frames 66, 69 essentially representing the flow of a river which has an outline 68. A vertex Px at a direction change is split into two vertices Px1 and Px2 and in this case instead of a triangle a square 611 is inserted (which may also be represented with two triangles). In FIG. 6C, also the construction of vertices Px1, Px2 from vertex Px can be seen. While Px is at an intersection of middle lines 67, 610, Px1 and Px2 are at intersections between lines 610 and 67, respectively, with lines perpendicular to lines 67, 610 starting at an intersection point 614 between frame 66 and frame 69.

In FIG. 7, an example for a representation of a river 71 in a three-dimensional landscape is shown, where the remaining landscape (the landscape not pertaining to river 71) is represented as a triangulated irregular network 70. With 74 as already mentioned a line representation of river 71 is designated, and 73A to 73D are triangles which have been inserted by splitting vertices as explained with reference to FIGS. 6A and 6B.

As already explained, instead of triangles in some case also squares, which may be seen as a combination of triangles may be used. Moreover, the height of the boundary lines of river 71, such as a polygon representing the river, may be made essentially as already explained with reference to FIGS. 3 and 4, for example by an interpolation between the two adjacent vertices.

Figure 8:
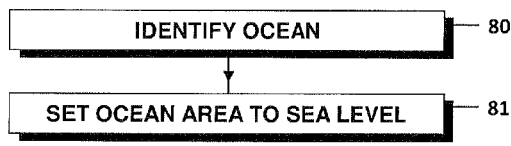
FIG. 8 is a flow chart representing a method for displaying three-dimensional landscapes according to another example.

As already mentioned, besides rivers other predetermined landscape types may be identified in examples of the present invention. In FIG. 8, a flow chart representing a method according to an example is shown where the predetermined landscape is an ocean. The method shown in FIG. 8 may be implemented in the navigation system of FIG. 1 and is an example for an implementation of the actions described with reference to 21 and 22 in FIG. 2.

At 80 in FIG. 8, an ocean is identified. At 81, the area of the ocean, for example all vertices defining triangles in a triangulated irregular network which are at least partly covered by the ocean, are set to sea level, such as zero meters above sea level. In this way, it is ensured that the ocean is flat and at sea level.

Figure 9:
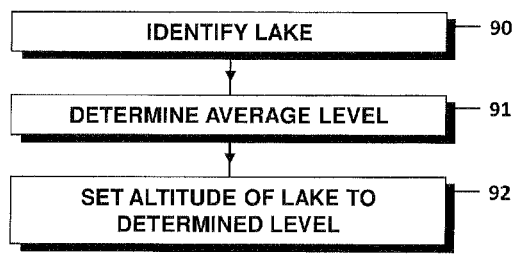
FIG. 9 is a flow chart representing a method for displaying three-dimensional landscapes according to another example.

Another possible predetermined landscape is a lake, which is somewhat similar to an ocean. FIG. 9 shows a flow chart representing an example of a method for handling lakes. The method of FIG. 9 may be implemented in the system of FIG. 1 and is an example for the implementation of the actions described with reference to 21 and 22 in FIG. 2. Like an ocean, a lake has an essentially flat surface. However, while an ocean is at or near sea level, a lake may be essentially at any altitude.

At 90, a lake is identified in a landscape to be displayed. At 91, an average level of altitude of the lake is determined. For example, an average of all vertices contributing to triangles at least partly covered by the lake of a triangulated network may be used, or the average altitude of all vertices covered by the area of the lake may be used. In an example, a weighted average is determined, where for example the weight decreases from a middle of the lake to a shore of the lake. Through such a weighting, the height of influence of the altitude of shore areas is reduced.

At 92, the altitude of the lake is set to the determined average level. For example, the altitude of all vertices defining triangles in the area covered by the lake may be set to the determined level. In other examples, for example an average level of the lake shore may be determined at 91.

A further type of landscape, which may for example be identified at 21 of FIG. 2 are buildings. In some examples, buildings are stored in a so-called 2.5D-format by storing a circumferential polygon defining the outline of the building, for example in a ground plane thereof, and an general height of the building.

Figure 10:
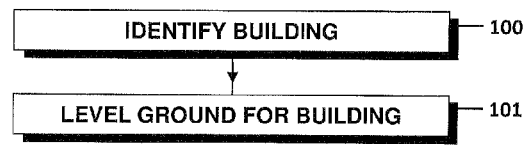
FIG. 10 is a flow chart representing a method for displaying three-dimensional landscapes according to another example.

In FIG. 10, a flow chart illustrating a method according to a further example is shown. The method of FIG. 10 may be implemented in the navigation system of FIG. 1 and is an example for the actions described with reference to 21 and 22 in FIG. 2. At 100, a building is identified in a landscape to be displayed. At 101, the ground for the building is leveled, for example, set to a single height. This leveling of the ground can be performed by actually changing vertices defining the ground to obtain a level surface for the building or may be performed "virtually" such that the building is set on a level ground which is different from the grounds that would be defined by vertices for example of a triangulated irregular network.

Non limitative illustrative examples for the leveling of the ground for a building at 101 will now be explained with reference to FIGS. 11A to 11C.

In FIG. 11A, a side view of a landscape defined by vertices 111 to 115 together with a building 116 without the application of the method of FIG. 10 are shown. As in particular vertices 112 and 114 have different altitudes, the building has a slanted topside, although it, in this simple example, is intended to have equal height on all sides and therefore a leveled top surface. It should be noted that for ease of reference in the example shown, the building is positioned directly on vertices 112 and 114. In other situations, the walls of the buildings may be situated between vertices.

In FIG. 11B, an actual leveling of the ground is shown. In the example of FIG. 11B, vertices 113 is moved to the altitude of vertex 112 to become vertex 113A, and vertex 114 is also moved to the level of vertex 112 to become vertex 114A, such that the building now rests on leveled ground and stands as intended as building 116A. It should be noted that while in the example of FIG. 11B the ground is leveled to the altitude of vertex 112, the ground may also be leveled to any other altitudes, for example the altitude of vertex 113 or 114 or also to an altitude being an average of the altitude of the involved vertices or being dependent on the height of the building to be represented, for example the ground may be leveled to an average height of the building or a fraction thereof, for example of the average height.

In FIG. 11C, an example for a "virtual" level ground is shown. In the example of FIG. 11C, vertices 111 to 115 rest at their place, and a virtual ground 117 on the altitude of vertex 112 is used upon which building 116B rests. In this case, the height of the building appears smaller at vertex 114 than at vertex 112. Also in the case of a virtual ground, the altitude of the virtual ground can be set to any desired level, for example—as in FIG. 11C—to the altitude of the lowest vertex involved to an altitude based on an average of the vertices involved or to another desired altitude.

In the examples described above, through the individual calculation of a representation of the identified predetermined landscape a more realistic representation of the respective landscape type may be obtained. It should be noted that in some examples additional vertices or edges may be introduced between the identified landscape type and the surrounding landscape as for example represented by a TIN network. In some examples, a transition function is defined, for example with values from zero to 1, which may be used to fuse adjacent areas, which for example may be represented by adjacent polygons like the above-mentioned river polygon and the triangles defined by the TIN data. For such a fusing or blending of adjacent polygons, polygons defining the identified landscape type which has been individually calculated may be left unchanged, and only the surrounding landscape may be adapted.

It should be noted that the various actions and operations described for the above-mentioned methods need not necessarily be performed in the indicated order. For example, in the example of FIG. 3, first the bisecting lines and the intersecting lines may be determined (33 and 34), and then the elevation of a frame may be limited to the elevation of a previous frame (32).

Furthermore, some examples may employ all the above described examples for different landscape types. There may identify rivers, lakes, oceans and buildings and handle them accordingly, whereas other examples may only be implemented to handle 1, 2 or 3 of these types. Still other examples may be configured to handle other predetermined landscape types than the ones described above in detail. Therefore, it is apparent that the scope of the present invention is not to be construed as being limited to the described examples.

While various examples of the invention have been described, it will be apparent to those of ordinary skill in the art that many more examples and implementations are possible within the scope of the invention. Accordingly, the invention is not to be restricted except in light of the attached claims and their equivalents.

We claim:

1. A method for displaying on a display a three-dimensional landscape, the method comprising the steps of:
    providing altitude data describing an altitude of a landscape and comprising a plurality of vertices to a processor,
    identifying by the processor at least one predetermined landscape element in the landscape that comprises a river,
    individually calculating by the processor a representation of the at least one predetermined landscape element by:
    dividing the river into a plurality of oriented frames;
    determining a bisecting line between each pair of adjacent oriented frames, wherein, for a given pair of adjacent oriented frames, the bisecting line bisects an angle formed between a first auxiliary line that runs along an inner frame border of one oriented frame included in the pair of adjacent oriented frames and a second auxiliary line that runs along an inner frame border of the other oriented frame included in the pair of adjacent oriented frames;
    determining intersections of the bisecting lines with a polygon representing the river; and
    setting altitudes of the polygon based on altitudes of the intersections; and displaying on the display the landscape based on the plurality of vertices and the individually calculated representation of the at least one predetermined landscape element.

2. The method of claim 1, where the altitude data further comprises triangulated irregular network data.

3. The method of claim 1, where the individually calculating a representation of the river further comprises the step of:
    for each oriented frame, limiting an altitude of the oriented frame to an altitude of a previous oriented frame.

4. The method of claim 1, where individually calculating the representation of the river further comprises the step of assigning each frame of the plurality of oriented frames an altitude based on the altitudes of vertices in an area covered by the frame.

5. The method of claim 1, where the at least one predetermined landscape element further comprises an ocean, and where individually calculating a representation of the ocean comprises setting an altitude of an area covered by the ocean to sea level.

6. The method of claim 1,
    where the at least one predetermined landscape element further comprises a lake, and
    where individually calculating a representation of the lake comprises determining a lake level based on altitudes of vertices in an area covered by the lake, and setting an altitude of the lake to the lake level.

7. The method of claim 6, where determining the lake level comprises the step of calculating a weighted average of the altitudes of the vertices in the area covered by the lake.

8. The method claim 1, where the at least one predetermined landscape element further comprises a building and where individually calculating a representation of the building comprises leveling a ground for the building.

9. The method of claim 8, where leveling the ground comprises one of setting vertices in an area covered by the building to a common ground level and providing a virtual ground level.

10. A system for displaying on a display a three-dimensional landscape, the system comprising:
    a processor,
    a storage device in communication with the processor, the storage device configured to store altitude data of a landscape and map data of a landscape, where the processor is configured to:
    identify at least one predetermined landscape element in a landscape to be displayed that comprises a river,
    individually calculate a representation of the at least one predetermined landscape element by:
    dividing the river into a plurality of oriented frames;
    determining a bisecting line between each pair of adjacent oriented frames, wherein, for a given pair of adjacent oriented frames, the bisecting line bisects an angle formed between a first auxiliary line that runs along an inner frame border of one oriented frame included in the pair of adjacent oriented frames and a second auxiliary line that runs along an inner frame border of the other oriented frame included in the pair of adjacent oriented frames;
    determining intersections of the bisecting lines with a polygon representing the river; and
    setting altitudes of the polygon based on altitudes of the intersections; and cause a display to display the landscape based on the individually calculated representation of the at least one predetermined landscape element and the altitude data.

11. The system of claim 10, where the altitude data further comprises triangulated irregular network data.

12. The system of claim 10, wherein the individually calculating the representation of the at least one predetermined landscape element further comprises:
    for each oriented frame, limiting an altitude of the plurality of oriented frame to an altitude of a previous oriented frame.

13. The system of claim 10, where the processor is further configured to assign each frame of the oriented frames an altitude based on the altitudes of vertices in an area covered by the frame.

14. The system of claim 10, where the processor is further configured to provide a line representation of the river, the line representation comprising line running between a series of river vertices, identify direction changes of the line representation, and split at least one river vertex at a direction change into at least two further river vertices.

15. The system of claim 14, wherein the processor is further configured to insert a plateau, where a border of the plateau runs through the further river vertices.

16. The system of claim 15, where the plateau is selected from the group consisting of a triangle and a square.

17. The system of claim 10, where the at least one predetermined landscape element further comprises an ocean, and where the processor is further configured to set an altitude of an area covered by the ocean to sea level.

18. The system of claim 10,
where the at least one predetermined landscape element further comprises a lake, and
where the processor is further configured to determine a lake level based on altitudes of vertices in an area covered by the lake, and set an altitude of the lake to the lake level.

19. The system of claim 18, where the processor is further configured to calculate a weighted average of the altitudes of the vertices in the area covered by the lake.

20. The system claim 10,
where the at least one predetermined landscape element further comprises a building, and
where the processor is further configured to calculate a representation of the building by leveling a ground for the building.

21. The system of claim 20, where leveling the ground comprises one of setting vertices in an area covered by the building to a common ground level and providing a virtual ground level.

22. A method for displaying on a display a three-dimensional landscape, the method comprising:
providing altitude data describing an altitude of a landscape and comprising a plurality of vertices to a processor,
identifying a single river in the landscape,
individually calculating, by a processor, a representation of a bend in the single river by:
providing a line representation of the single river, the line representation comprising a line running between a series of river vertices;
identifying a direction change of the line representation from a first direction to a second direction that is reflective of the bend in the single river; and
splitting at least one river vertex at the direction change of the line representation into at least two further river vertices, wherein one river vertex of the at least two further river vertices is intersected by the line representation in the first direction and the other river vertex of the at least two further river vertices is intersected by the line representation in the second direction;
inserting a plateau comprising a square and having borders that run through the at least two further river vertices; and
displaying on the display the landscape based on the plurality of vertices and the individually calculated representation of the bend in the single river.

* * * * *